(12) United States Patent
Luo et al.

(10) Patent No.: US 6,846,500 B1
(45) Date of Patent: Jan. 25, 2005

(54) ORAL CARE CHEWING GUMS AND METHOD OF USE

(75) Inventors: Shiuh John Luo, Livingston, NJ (US); Lucy Lee Wong, Lake Hiawatha, NJ (US)

(73) Assignee: Cadbury Adams USA LLC, Wilmington, DE (US)

( * ) Notice: Subject to any disclaimer, the term of this patent is extended or adjusted under 35 U.S.C. 154(b) by 0 days.

(21) Appl. No.: 09/489,241

(22) Filed: Jan. 21, 2000

Related U.S. Application Data

(60) Provisional application No. 60/126,032, filed on Mar. 25, 1999.

(51) Int. Cl.⁷ .............................. A23G 3/30; A61K 9/68
(52) U.S. Cl. .............................. 426/3; 424/48; 424/440
(58) Field of Search ........................ 426/3, 5; 424/48, 424/440

(56) References Cited

U.S. PATENT DOCUMENTS

| | | | |
|---|---|---|---|
| 3,590,126 A | 6/1971 | Muhler | 424/48 |
| 4,170,633 A | 10/1979 | Wagenknecht | 424/48 |
| 4,866,161 A | 9/1989 | Sikes et al. | 530/324 |
| 4,868,287 A | 9/1989 | Sikes et al. | 530/324 |
| 4,952,407 A | 8/1990 | Record et al. | 424/440 |
| 5,130,123 A | 7/1992 | Reynolds et al. | 424/48 |
| 5,227,154 A | 7/1993 | Reynolds | 424/48 |
| 5,618,517 A | 4/1997 | Miskewitz | 424/48 |
| 5,629,035 A | 5/1997 | Miskewitz | 426/5 |
| 5,693,334 A | 12/1997 | Miskewitz | 424/440 |
| 5,702,687 A | 12/1997 | Miskewitz | 424/52 |

FOREIGN PATENT DOCUMENTS

| | | |
|---|---|---|
| EP | 629393 A2 | 12/1994 |
| JP | 4077415 | 3/1992 |
| WO | WO 8707615 | 12/1987 |
| WO | WO 9840406 | 9/1998 |

*Primary Examiner*—Arthur L. Corbin
(74) *Attorney, Agent, or Firm*—Watov & Kipnes, P.C.

(57) ABSTRACT

The present invention pertains to a method for providing dental hygiene which method employs a low moisture chewing gum or confectionery product containing as active ingredients, a combination of sodium bicarbonate and casein phosphopeptide-amorphous calcium phosphate. The invention also concerns the chewing gums and confectionery products that can provide dental health benefits and methods for their preparation.

6 Claims, No Drawings

ORAL CARE CHEWING GUMS AND METHOD OF USE

This application claims priority to provisional application Ser. No. 60/126,032 Filed: Mar. 25, 1999

BACKGROUND OF THE INVENTION

1. Field of the Invention

This invention concerns a method for promoting dental hygiene in particular by reducing plaque, whitening teeth, preventing tooth demineralization and providing tooth remineralization. The method employs a chewing gum or confectionery product containing as active ingredients, a combination of sodium bicarbonate and casein phosphopeptide-amorphous calcium phosphate. The invention also concerns the chewing gums and confectionery products that can provide dental health benefits and methods for their preparation.

2. Description of the Prior Art

The formation of dental caries in teeth has been well studied. Caries are understood to result from the accumulation of plaque on the teeth and the production of organic acids (plaque acids) when plaque microorganisms ferment sugars and starches in food. Before being washed away by saliva, the acids accumulate in the plaque long enough to lower the pH and to cause some of the enamel, a calcium-phosphorous mineral known as hydroxyapatite, to dissolve, that is, demineralize, which can lead to dental caries (tooth decay), and sensitivity.

Plaque itself which is a sticky film of the oral bacteria and their products, can become calcified with the ultimate formation of a hard mineral on the teeth. Calculus, or tartar as it is sometimes called, is the solid, hard mass of calcified material deposited on and adhering to the surfaces of the teeth. As mature calculus develops it becomes visibly white or yellowish in color. Plaque formation can lead to gingivitis and subsequent periodontal disease.

Efforts have been made over the years to address the problem of plaque accumulation and the dissolution or demineralization of tooth enamel and the resultant formation of dental caries.

It is known to use sodium bicarbonate (NaHCO$_3$), in dental care for the purpose of reducing plaque and whitening teeth, and further for reducing oral malodor. Also known as baking soda or bicarbonate of soda or carbonic acid monosodium salt, sodium bicarbonate has long been used in dentifrices such as pastes and oral rinses, often in combination with sodium chloride. It can buffer plaque acids, which cause demineralization of teeth, by returning the oral pH to a more favorable pH. In high concentrations, it is bactericidal against most periodontal pathogens. Sodium bicarbonate has found recent favor over alternatives for its low cost, safety if ingested, low abrasivity due to its high solubility, and compatibility with fluoride. Sodium bicarbonate has been used in chewing gums as a filler, a buffer, a dental plaque remover, as an abrasive when used in higher amounts.

U.S. Pat. No. 3,590,120 teaches a chewing gum containing a dental plaque removal agent and a dental polishing agent. Sodium bicarbonate is taught as a dental plaque removal agent. U.S. Pat. No. 4,170,633 discloses chewing gums for delivering alkyl sulfates as plaque inhibiting agents. Sodium bicarbonate is used as a buffer. U.S. Pat. No. 4,952,407 teaches chewing gums for reducing dental plaque containing glycerol mono laurate. Sodium bicarbonate is used as a filler. U.S. Pat. Nos. 5,702,687, 5,693,334, 5,618,517, and 5,629,035 teach chewing gums for dental care which contain organically encapsulated sodium bicarbonate.

Casein phosphopeptides-amorphous calcium phosphate complexes are known to have anticariogenic teeth strengthening effects when used as dentrifrices. The complexes, also known as CPP-ACP complexes or calcium casein peptone-calcium phosphate are amorphous calcium phosphate stabilized by casein phosphopeptides. CPP-ACP depresses demineralization and enhances remineralization while buffering plaque acid. It acts by localizing calcium and phosphate ions in dental plaque at the tooth surface. This increased level of calcium and phosphate in dental plaque helps buffer plaque acid and maintain a state of supersaturation of calcium and phosphate in solution. i.e. in the saliva. The use of casein phosphopeptides alone for prevention of caries and plaque formation is also known. The use of chewing gum as a carrier for CPP-ACP has been suggested.

U.S. Pat. Nos. 5,130,123 and 5,227,154 teach casein phosphopeptides in prevention of dental caries. WO 98/40406 teaches phosphopeptide-calcium phosphate complexes to provide anti-caries efficacy.

While it would be very desirable to combine in one delivery system the plaque reduction and tooth whitening benefits of sodium bicarbonate with the remineralization and strengthening of teeth provided by CPP-ACP, it is known that sodium bicarbonate will react with calcium phosphate to form calcium carbonate. Combining sodium bicarbonate with CPP-ACP, would be expected to precipitate calcium carbonate thereby diminishing the supply of calcium ions and concomitantly diminish the efficacy of CPP-ACP. A combination of the two dental care components in a system such as traditional oral rinses and pastes, would result in a diminishing or deactivation of the remineralization efficacy of the CPP-ACP.

SUMMARY OF THE INVENTION

The present invention concerns a method for providing dental hygiene which method employs a low moisture chewing gum comprising:

(a) from about 10% to about 95% by weight gum base, (b) from about 0.1% to about 15% by weight of sodium bicarbonate, and, (c) from about 0.01% to about 30% by weight of CPP-ACP.

The present invention further concerns a method for providing dental hygiene which employs a low moisture confectionery product comprising:

(a) from about 10% to about 95% by weight confectionery base, (b) from about 0.1% to about 15% by weight of sodium bicarbonate, and, (c) from about 0.01% to about 30% by weight of CPP-ACP.

The invention also concerns the chewing gums and confectionery products containing the active ingredients.

DETAILED DESCRIPTION OF THE INVENTION

The present invention, as stated above, concerns low moisture chewing gums and confectionery products which reduce plaque, whiten teeth, prevent tooth demineralization and provide tooth remineralization in the oral cavity. The chewing gums and confections contain as active ingredients, a combination of sodium bicarbonate and casein phosphopeptide-amorphous calcium phosphate complexes. The present invention overcomes the problem of combining the ingredients in an oral delivery system by use of a low moisture, solid system such as a chewing gum or a confection. By a low moisture chewing gum or confection is meant one that contains less than 2% moisture. The chewing gum is also preferably sugarless.

In the chewing gums and confections of the present invention the ingredients cannot admix prior to use by the consumer, that is, could not admix upon storage. The chewing gum and confections in effect "compartmentalize". i.e. separate the two components. In a further embodiment of the invention each component could be in a separate and discrete layer of gum or confection. In still another embodiment of the invention one or both of the components could be encapsulated to prevent contact until the gum or confection is consumed.

The chewing gums and confections may contain from 0.1% to 15% by weight of sodium bicarbonate and from 0.01% to 30% by weight of CPP-ACP. It is preferred to use from 0.1% to 10% by weight of sodium bicarbonate and from 0.01% to 10% by weight of CPP-ACP. For chewing gums it is desirable to have the CPP-ACP and sodium bicarbonate present in a weight ratio of approximately 1:5.

Chewing gums, because of prolonged contact with the oral cavity in use, and due to the fact that a gum base can provide for sustained release of the active components, provide an excellent delivery system for the active ingredients and are preferred. The invention also concerns confections, in particular candy confections, especially pressed candy confections. Conventionally pressed candy confections such as tablets contain about or less than 0.5% moisture and provide an excellent delivery system for the active ingredients.

Manufacture of chewing gums and confections such as pressed tablets are well known and are taught in E. B. Jackson, Ed. "Sugar Confectionery Manufacture". 2nd edition. Blackie Academic & Professional Press. Glasgow UK, (1990), at pages 259 and 236 respectively, and in R. Lee and E. B. Jackson, Eds. "Sugar Confectionery and Chocolate Manufacture", Chapman and Hall, UK. (1992), at pages 332 and 286 respectively.

The chewing gum can be any convenient formulation. The gum formulation can be sugar free or it can contain sugar. It generally comprises one or more natural or synthetic elastomers which is supplemented by conventional chewing gum ingredients. These ingredients include one or more solvents, plasticizers, fillers, flavoring agents, coloring agents and/or sweetening agents. Elastomers which are suitable for use herein include substances of vegetable origin such as chicle, jelutong, gutta percha, guayale and crown gum. Synthetic elastomers such as butadiene-styrene copolymers, isobutylene-isoprene copolymers, polyethylene, polyisobutylene, polyvinylacetate, and mixtures thereof are also useful. The elastomer generally comprises from about 14% to 50% by weight, preferably from about 20% to about 30% by weight, of the chewing gum composition. Polyvinyl acetates may also be used with the elastomers to provide stretch or elasticity to the gum.

The chewing gum composition can contain elastomer solvents to aid in softening the polymer component. Such elastomer solvents can include methyl, glycerol or pentaerythritol esters of rosins or modified rosins, such as hydrogenated, dimerized or polymerized rosins or mixtures thereof. Terpene resins, including polyterpene and mixtures thereof are also useful. The solvent can be employed in an amount ranging from about 10% to 75% and preferably about 15% to about 50% by weight of the chewing gum composition.

A variety of traditional ingredients used as plasticizers or emulsifiers such as lanolin, lecithin, glycerol monostearate, stearic acid, glycerol triacetate, triacetin, glycerine and the like can also be incorporated into the chewing gum composition to obtain a variety of textures and consistency properties. These additional materials also include waxes such as natural waxes, petroleum waxes and microcrystalline waxes and fats and oils including animal fats such as lard and tallow, vegetable oils such as soybean and cottonseed oil, hydrogenated and partially hydrogenated vegetable oil and cocoa butter. These ingredients are generally employed in amounts of up to about 30% by weight, preferably 1% to 25% by weight and more preferably from about 3% to about 7% by weight of the final chewing gum composition.

The chewing gum composition can additionally include conventional coloring agents such as titanium dioxide, in amounts up to 2% and fillers such as dicalcium phosphate, magnesium carbonate, aluminum hydroxide, alumina, aluminum silicates, talc, calcium carbonate, cellulose, and combinations thereof in amounts of from 5 to 35% by weight of the final composition.

The chewing gum composition may also contain bulk sweeteners including sugars such as sucrose, dextrose, maltose, fructose and the like or sugar alcohols such as sorbitol, mannitol, xylitol, maltitol, isomalt, cryihritol and hydrogenated starch hydrolysates and combinations thereof. Bulk sweeteners may be present in amounts up to 90% by weight of the final composition. High intensity sweeteners such as aspartame, acesulfame salts, aliatame saccharin and the like may also be present. These sweeteners may be present in amounts of up to 1% by weight of the final gum composition.

The chewing gum may contain flavoring agents in addition to the enhanced flavoring compositions in amounts up to 3.5%. Generally any food additive such as those described in "Chemicals Used In Food Processing", publication 1274, pages 63–258, by the National Academy of Sciences, may be used.

The chewing gum is generally manufactured by methods known in the art by sequentially adding the various chewing gum components to any commercial mixer or extruder in a batch or continuous process. After the ingredients have been thoroughly mixed the mass is discharged and formed.

The preparation of confectionery formulations is historically well known and has changed little through the years. In general a hard boiled candy confection has a base composed of a mixture of sugar and other carbohydrate bulking agents kept in an amorphous or glassy condition having from about 0.5% to about 5% moisture. In the present application the moisture content is 2% or less. The base normally contains up to about 75% sugar (sucrose) and up to 65% corn syrup, with a higher sucrose to corn syrup ratio. Further ingredients such as flavoring agents, sweetening agents, acidulants, colorants and so forth may also be added. Hard boiled candies may also be prepared from nonfermentable sugars such as sorbitol, mannitol, xylitol, maltitol, erythritol, hydrogenated starch hydrolysates and the like. A general discussion of the composition and preparation of hard confections may be found in E. B. Jackson, Ed. "Sugar Confectionery Manufacture". 2nd edition, Blackie Academic & Professional Press, Glasgow UK, (1990), at pages 129–169.

Such confectionery may be routinely prepared by conventional methods such as those involving fire cookers, vacuum cookers, and scraped-surface cookers also referred to as high speed atmospheric cookers. Once the candy mass has been properly tempered, it may be cut into workable portions or formed into desired shapes. A variety of forming techniques may be utilized depending upon the shape and size of the final product desired.

Soft candy confectionery includes fondants, caramels toffees, fudge, marshmallows and nougats and the like and may also include jams and jellies. The preparation of soft confections, such as nougat, involves conventional methods, such as the combination of two primary components, namely (1) a high boiling syrup such as a corn syrup, or the like, and (2) a relatively light textured frappe, generally prepared from egg albumin, gelatin, vegetable proteins, such as soy derived compounds, milk derived compounds such as milk proteins, and mixtures thereof. Further ingredients such as the enhanced flavoring agent, flavoring agents, additional carbohydrate bulking agent, colorants, preservatives, medicaments, mixtures thereof and the like may be added thereafter also under agitation. A general discussion of the composition and preparation of such confections may be found in E. B. Jackson. Ed. "Sugar Confectionery Manufacture". 2nd edition. Blackie Academic & Professional Press. Glasgow UK. (1990), at pages 170–235.

Compressed tablet confections, a preferred embodiment, contain particular materials and are formed into structures under pressure. These confections generally contain sugars or sugar substitutes in amounts up to about 95%, by weight of the composition, and typical tablet excipients such as binders and lubricants as well as the enhanced flavoring agent, flavoring agents, colorants and so forth.

The following examples are provided to illustrate the preferred embodiments of the invention.

EXAMPLE 1

This example shows precipitation of calcium carbonate upon mixing sodium bicarbonate with CPP-ACP under conditions which mimic mixing the two components in the environment of the oral cavity for a brief contact period and under prolonged contact time.

The amount of CPP-ACP and sodium bicarbonate combined for the test were based upon an in vivo pre-test done to determine how much CPP-ACP and sodium bicarbonate would be expected to be extracted into the oral cavity, upon chewing, from a gum containing CPP-ACP and sodium bicarbonate in a 1:5 weight ratio present at approximately 1% CPP-ACP and 5% sodium bicarbonate.

The in vivo test was done to first determine the release of CPP-ACP. A five person panel chewed a gum containing 1% CPP-ACP. Release of CPP-ACP was determined as 2.43 mg/ml. Using this data and assuming a similar release for sodium bicarbonate, the concentrations of CPP-ACP and sodium bicarbonate released into the oral cavity were determined to be 0.30% CPP-ACP and 2% sodium bicarbonate for a final CPP-ACP concentration=3 mg/ml. CPP-ACP and sodium bicarbonate at these concentration were incubated in a 30 ml pooled human saliva with moderate shaking at 37° C. for 3 minutes to test precipitation upon consumption of the gum and at 1 hour to show how longer contact time would precipitate calcium carbonate. The resultant pH of the incubation solution was approximately 7. The solution was filtered, the retentate was rinsed with deionized $H_2O$ to remove any soluble calcium and the result was analyzed for calcium content by Atomic Absorption analysis. As a control an aqueous solution of 30 g of a 0.3% CPP-ACP solution was pass through the filter paper. 0.3 mg of precipitated calcium was noted. Also, the same experiment was repeated for saliva and a 2% sodium bicarbonate solution and 1.7 mg of calcium was retained by filter paper. The incubation of 0.3% CPP-ACP with 2% sodium bicarbonate in 30 g saliva for 3 min. resulted 2.5 mg calcium retained by the filter paper which calculates as about 0.5 mg calcium precipitation. The insoluble calcium accounted for 3.7% of total CPP-ACP precipitated in 3 minutes. Using the same calculation for the 1 hour incubation, 15.6% of CPP-ACP interacted and precipitated.

The following table shows the results of various test periods:

| Test | Calcium retained |
| --- | --- |
| 30 g of aqueous solution with 0.3% CPP-ACP | 0.300 mg |
| 30 g of saliva with 2% $NaHCO_3$ stored at 37° C. for 3 minutes | 1.700 mg |
| 30 g of saliva with 0.3% CPP-ACP and 2% $NaHCO_3$ stored at 37° C. for 3 minutes | 2.500 mg |
| 30 g of saliva with 2% $NaHCO_3$ stored at 37° C. for 1 hour | 1.600 mg |
| 30 g of saliva with 0.3% CPP-ACP and 2% $NaHCO_3$ stored at 37° C. for 1 hour | 4.000 mg |

The test showed that approximately 4% of the 1% of CPP-ACP is consumed in 3 min. and approximately 16% of the 1% in 1 hr. A concomitant reduction in activity could be expected. The result indicates that for the short period of time needed to release CPP-ACP and sodium bicarbonate from a chewing gum into the oral cavity (a 10 min. chewing of a gum containing 1% CPP-ACP and 5% of sodium bicarbonate) CPP-ACP has a very small probability of losing efficacy. However, as expected, interactions of the sodium bicarbonate and CPP-ACP increase with a longer time exposure, which may indicate is potential loss of CPP-ACP efficacy during shelf storage in the presence of moisture.

EXAMPLE 2

This example shows the efficacy of CPP-ACP in remineralization when used in a chewing gum containing CPP-ACP and sodium bicarbonate in the weight ratio of 1:5. A pellet-type chewing gum was formulated as follows:

| Pellet Gum: | |
| --- | --- |
| INGREDIENT | % |
| Gum Base | 30.77 |
| Softeners | 0.23 |
| Polyols | 61.05 |
| Intense Sweeteners | 0.21 |
| Flavors | 1.57 |
| Sodium Bicarbonate | 3.76 |
| CPP-ACP | 0.71 |
| Gum Arabic | 1.70 |

The gum had a total delivery size (two pieces) of 2.9 g providing approximately 20.6 mg CPP-ACP.

The gum was used in a test designed as a two-week product usage, double-blind, four-way crossover test with a one week rest between the crossover tests. A sugarfree gum formulated without the actives was used for comparison. The gums were chewed four times per day for 20 minutes each chewing. The test subjects met minimums for salivary flow rate. A removable palatial appliance with human-enamel, half-slab insets containing subsurface demineralized lesion was used. The other half of each enamel slab was stored and used as the control demineralized lesion. Appliances were worn by subjects during gum chewing and 20 minutes after chewing. At the completion of each treatment the enamel slabs were removed, paired with their respective demineralized control and the enamel remineralization was measured by microradiography to determine the percent of remineralization of the test enamel slab vs. the demineralized enamel slab. The following table shows the resultant mean percent remineralization. Also provided for comparison is the mean percent remineralization obtained for a gum containing solely CPP-ACP as the active. (This gum delivered 18.8 mg of CPP-ACP. The inventive gum containing 20.6 mg had an approximate 10% overage.)

| Percent Remineralization: | | |
| --- | --- | --- |
| Test: | | |
| Control (No Gum) | Sugarfree Gum | CPP-ACP/Sodium Bicarbonate Gum |
| 2.499 ± 0.41% | 9.107 ± 0.42% | 18.297 ± 1.85% |
| Comparison: | | |
| Control (No Gum) | CPP-ACP Gum | |
| 4.36 ± 1.65% | 17.06 ± 2.48% | |

The results demonstrate that CPP-ACP in the presence of baking soda results in significant remineralization when compared with a sugarfree gum as a control. The test further shows that the remineralization is equivalent to that provided by a gum containing CPP-ACP as the active.

What is claimed is:

1. A method for providing a dental hygiene effect which method comprises placing a low moisture chewing gum in the oral cavity comprising:

(a) from about 10% to about 95% by weight gum base; and, (b) from about 0.1% to about 15%% by weight of sodium bicarbonate; and, (c) from about 0.01% to about 30% by weight of CPP-ACP wherein the sodium bicarbonate and CPP-ACP are kept separate from each other until chewing; and, chewing the low moisture chewing gum for a time sufficient to provide said dental hygiene effect.

2. The method according to claim 1 wherein the low moisture chewing gum is a sugarless gum.

3. The method according to claim 1 wherein the low moisture chewing gum comprises:

(a) from about 0.1% to about 10%% by weight of sodium bicarbonate, and, (b) from about 0.01% to about 10% by weight of CPP-ACP.

4. A low moisture chewing gum comprising (a) from about 10% to about 95% by weight gum base; and, (b) from about 0.1% to about 15% by weight of sodium bicarbonated; and, (c) from about 0.01% to about 30% by weight of CPP-ACP, said sodium bicarbonate and said CPP-ACP component being separated from each other.

5. The gum according to claim 4 wherein the low moisture chewing gum is a sugarless gum.

6. The low moisture chewing gum according to claim 4 wherein the gum comprises:

(a) from about 0.1% to about 10% by weight of sodium bicarbonate; and, (b) from about 0.1% to about 10% by weight of CPP-ACP.

* * * * *